United States Patent [19]

Boone et al.

[11] Patent Number: 5,514,874

[45] Date of Patent: May 7, 1996

[54] METHOD AND APPARATUS FOR NON-INVASIVE IMAGING INCLUDING QUENCHABLE PHOSPHOR-BASED SCREENS

[75] Inventors: John M. Boone, Folsom, Calif.; Melvin Tecotzky, Mendham, N.J.

[73] Assignee: Thomas Jefferson University, Philadelphia, Pa.

[21] Appl. No.: 192,770

[22] Filed: Feb. 7, 1994

Related U.S. Application Data

[63] Continuation of Ser. No. 919,989, Jul. 27, 1992, abandoned.
[51] Int. Cl.$^6$ ...................................................... G21K 4/00
[52] U.S. Cl. .................................. 250/486.1; 250/487.1
[58] Field of Search .............................. 250/487.1, 486.1, 250/483.1, 327.2 R, 488.1; 378/185

[56] References Cited

U.S. PATENT DOCUMENTS 2,452,522  10/1948  Leverenz ................................ 250/486.1

FOREIGN PATENT DOCUMENTS 47-43037  10/1972  Japan .

OTHER PUBLICATIONS

S. A. Popok and F. D. Klement, "Effect Of IR Rays On The Excitation Of The Luminescence Of ZnSCu Phosphors", Journal of Experimental and Theoretical Physics, 10:800–807 (1940).

J. Saddy, Photoluminescence of Zinc Sulfide, Annals Physics, 1202:414–455 (1947).

G. G. Blake, Infra-Red Radiations With Special Reference To Their Quenching Effects Upon Zinc Sulphide Phosphors, Journal Royal Society of N.S.W., vol. LX, 112–124.

Primary Examiner—Carolyn E. Fields
Attorney, Agent, or Firm—Woodcock Washburn Kurtz Mackiewicz & Norris

[57] ABSTRACT

An invention is described which uses quenchable phosphors to achieve a novel emission response in intensifying screens. The quenchable phosphor has the characteristic of reducing its efficiency of converting incident x-ray, gamma ray, or ionizing particulate radiations into emitted radiation in the ultraviolet (UV), visible or infrared (IR) regions of the electromagnetic spectrum when being essentially simultaneously irradiated by a spectrum of radiation of a specific range in the UV to visible to IR spectrum. The quenchable phosphor is combined with another class of phosphor, which emits the spectrum of radiation when struck by ionizing radiation which is similar or identical to the quenching radiation of the quenchable phosphor. These phosphors can be combined in a variety of geometrical manners, both homogeneously and heterogeneously, to achieve extended dynamic range and spatial frequency filtering for radiographic imaging systems. The invention has equal application for electronic imaging systems such as x-ray image intensifiers. In addition, a system comprising the quenchable phosphors can be built in such a manner as to overcome the optical stage quantum sink limitations in electronic imaging.

30 Claims, 6 Drawing Sheets

METHOD AND APPARATUS FOR NON-INVASIVE IMAGING INCLUDING QUENCHABLE PHOSPHOR-BASED SCREENS

This is a continuation, of application Ser. No. 919,989, filed Jul. 27, 1992, now abandoned.

FIELD OF THE INVENTION

The present invention relates generally to the field of medical imaging, particularly radiography and fluoroscopy. The invention will also find application in the fields of non-destructive testing, airport security fluorography, and radio labeled auto radiography.

BACKGROUND OF THE INVENTION

Radiography for medical and other purposes has been available since 1896, shortly after the discovery of x-rays by Roentgen. In medical radiography, x-ray film is placed inside a light-tight cassette, where it lays in close contact with one or two x-ray intensifying screens. Dual-screen systems are most common for general radiographic work, and so these systems will be described.

The x-ray film is generally composed of a transparent, thin plastic base with two photographic emulsions, one coated onto each side. When placed inside the cassette, the two x-ray intensifying screens make very tight physical contact with the film. The cassette is placed behind the anatomical area of the patient that is to be radiographed, and the x-rays are turned on briefly. The x-rays pass through the patient and an x-ray shadow is cast onto the cassette which shadow has a profile reflective of the anatomical profile within the radiographed area.

The photographic emulsion is a thin layer composed of silver bromide, which is not a very efficient absorber of x-rays. The purpose of the intensifying screens is to absorb the x-rays. Such absorption within each screen causes radiation emissions in the ultraviolet, visible or infrared region of the electromagnetic spectrum. This emitted radiation ("light") then exposes the photographic emulsion. The exposed film is developed chemically, and the radiographic image is rendered visible. Although the indirect exposure of the photographic emulsion by the light emitted by the screen reduces some of the spatial resolution in the image, this loss is acceptable because the introduction of the screen results in a dramatic reduction in radiation dose to the patient. Screens are virtually always used in diagnostic radiography.

X-ray intensifying screens are intrinsically linear, over a wide dynamic range. This means that the light emitted by the screen increases in direct, linear, proportion to the amount of x-rays that strike the screen (x-rays of the same energy distribution). Unfortunately, the dynamic range of the film cannot match that of the screen. Dynamic range in radiological imaging is also called latitude.

Figure 1:
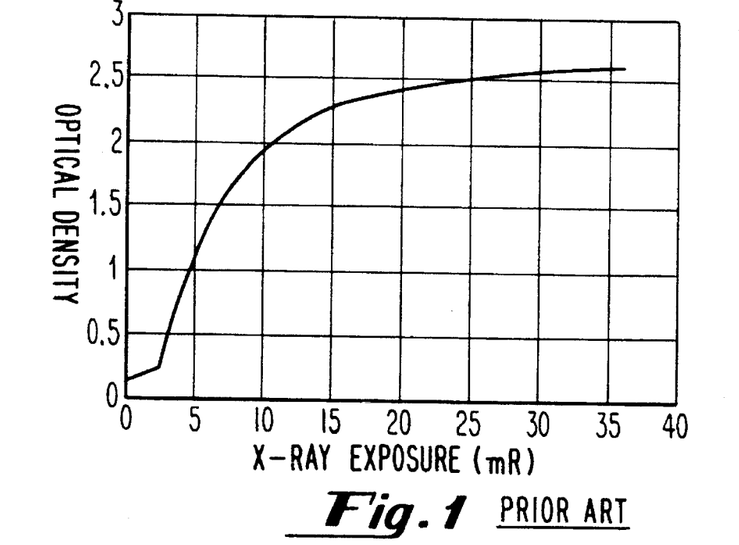
FIG. 1 is a typical characteristic curve for a screen-film combination.

The characteristic curve of a typical screen-film system is shown in FIG. 1, also referred to as an Hurter-Drifield curve or H & D curve. The optical density of radiographic film ranges from about 0.13 (which reflects primarily attenuation of light by the film base plus a minimal amount of fog), to a maximum of about 3.1 to 3.6 or so. The characteristic curve for typical film used in radiographic systems is plotted as the optical density versus radiation exposure to the cassette.

Low exposures result in images that are very light, and have less contrast, than images exposed towards the center of the characteristic curve. Exposures that are about midrange in the characteristic curve result usually in the best looking images, because this is where the contrast of the film is the greatest. High exposures result in images that are too dark to be useful, and these often need to be repeated.

Contrast can be calculated as the slope of the characteristic curve, and this is plotted in FIG. 1 also. With proper exposure, the radiographic image can be well visualized when the film is placed on a view box which provides back illumination of the film. This is the normal viewing situation in radiology.

The characteristic curve of film imposes a compromise for designers of screen-film systems. For screen-film systems which have a large dynamic range (wide latitude in radiology vernacular), the contrast of the image is necessarily reduced. On the other hand, for high contrast screen-film systems, the latitude or dynamic range of the system is reduced. Because of these two constraints, wide latitude systems are generally used in imaging procedures where a large dynamic range needs to be imaged (e.g. chest radiography), and high contrast, reduced-latitude systems are used in imaging applications where only a small latitude needs to be accommodated (e.g. bone radiography).

In conventional screen-film radiography, the intensifying screen is coupled directly to a film. Many efforts have focused on using an electronic imaging device, such as a charge coupled display (CCD) camera, that is positioned to detect the light emitted from the intensifying screen. These scenarios typically have the CCD camera optically or fiber-optically coupled to the light emitted from a screen when struck by x-rays. There is a well known, fundamental problem in this design that arises due to the quantum sink, i.e., loss of light, that the optical coupling stage poses in the system.

Consequently, a need still exists for a screen-film system having a large dynamic range and high contrast and for a screen-film system which avoids the quantum sink problem. The invention achieves such a system through a unique combination of x-ray phosphors, each with specific response characteristics such as the quenchability of light emitted in response to x-ray irradiation. The quenchable phosphor can be used in a design that will not only provide large dynamic range and high contrast, but which will also overcome the quantum sink problems associated with the optical stage in digital radiographic systems. In relation to the description of the invention herein, x-ray phosphors have been catagorized into several classes.

Three classes of x-ray phosphors are envisioned as being combined within the scope of the invention. The general characteristics of each class are now described and the terminology is defined:

Class 1 phosphors are quenchable. They emit light of a particular wavelength or wavelengths when struck by x-rays in a quasi-linear fashion, however when simultaneously struck by other radiations (not x-rays) of a specific wavelength or wavelengths (e.g. infrared), their light emission is reduced. For example, place a class 1 phosphor into a beam of constant-intensity x-rays. It will emit light of particular wavelength(s), say green light. If a source of (for example) infrared radiation is brought near the class 1 phosphor, its emission of green light will be reduced, even if the incident x-ray fluence rate (photons/cm$^2$/second) remains constant. The infrared radiation, in this example, quenches some fraction of the class 1 phosphor's characteristic emission.

The radiation which causes the class 1 phosphor to reduce its emission is called the quenching radiation. In the above example, infrared radiation was discussed, but quenching radiation can be of any spectral composition outside the x-ray region. In addition, the class 1 phosphor emits radiation of wavelengths that are usable, meaning that these wavelengths are capable of exposing the film emulsion. Film emulsion can be designed to be sensitive to the wavelengths emitted by particular phosphors. The techniques for designing such emulsion sensitivities are known.

Class 2 phosphors emit radiation when struck by x-rays, in a quasi-linear fashion. The class 2 phosphor emits radiation which is of the correct spectral composition such that it quenches the emission of the class 1 phosphor. In other words, the class 2 phosphor emits quenching radiation when struck by x-rays. The emission of the class 2 phosphor is unusable, meaning that the film emulsion is relatively insensitive to these wavelengths.

A class 3 phosphor, in the context of the present discussion, is any phosphor which is not quenchable, does not emit quenching radiation, and emits an usable, i.e., emulsion sensitive, emission.

To summarize the characteristics of the three classes of phosphors defined here, the class 1 phosphor is a quenchable phosphor, which emits usable, non-quenching radiation. Class 2 and class 3 phosphors are conventional (non-quenchable), linear x-ray phosphors, which emit light in proportion to the amount of x-rays incident upon them. Class 2 phosphors emit radiations which are capable of quenching the emission of the class 1 phosphor, but are unusable in exposing the film, whereas the class 3 phosphor emission does not have quenching properties, but is usable in exposing the film.

SUMMARY OF THE INVENTION

One embodiment of the present invention addresses the circumstances which impose the compromise between high contrast and high latitude screen-film systems. The wide dynamic range, and linear response (i.e. emission of light) of the screen to x-rays results in somewhat of a mismatch between the relatively narrow dynamic range, non-linear response (optical density after development) of the film emulsion to the light emitted by the screen. By changing the formulation of the phosphors used in the x-ray intensifying screens, a screen can be developed which produces a non-linear response to x-ray exposure. Specifically, at high levels of x-ray exposure, the screen can be designed to emit less light than a conventional (linear) screen would normally emit. As used herein, "light" refers to ultraviolet, visible or infrared radiation which is emitted by the x-ray intensifying screen when struck by x-rays, electrons, alpha or beta particles. The advantages of such a system are tremendous. By designing a screen with a very compressed range of light emission (i.e. a non-linear light output), a wide x-ray exposure latitude could be accommodated, but the range of optical emissions incident onto the film emulsion would be reduced. This allows the film emulsion to be designed, i.e. to have a particular characteristic curve, to render high contrast images, since the screen is now capable of reducing the dynamic range of the light that strikes the film.

Another embodiment of the quenchable/quenching phosphor combination would be to accomplish equalized radiography. In such a system, the primary phosphor emits light that is detected by a detector. A secondary, quenching phosphor, separated upstream from the first phosphor by a transparent spacer, is designed to cast a blurred (or very blurred) image onto the primary phosphor. This blurred image would act to reduce the total useful output of the overall screen for low frequency, large areas of the image, but would retain the higher frequency information emitted by the primary phosphor. In this manner, the imaging receptor not only reduces the dynamic range requirements of the detector, but it also causes high pass spatial filtering of the image to be achieved. By proper design of the degree of blurring, this system would accomplish in a conventional single cassette what is known as radiographic equalization.

A still further embodiment of quenchable phosphors is to eliminate the quantum sink in the optical coupling between an electronic camera and a radiographic screen. A screen is positioned to absorb the x-rays after passing through a patient or object, and emits a radiation which causes quenching of a quenchable phosphor coated onto the back of the screen. A stimulating source such as an ultraviolet (UV) lamp causes excitation of the phosphor. With no x-rays, there is no quenching and the quenchable phosphor emits a maximum number of light photons that can be detected by an electronic camera focussed onto the back of the screen. With x-rays turned on, the x-rays induce the emission of quenching radiation (proportional to the x-ray intensity), which in turn quenches the emission of the quenchable phosphor, reducing the light signal received by the electronic camera.

BRIEF DESCRIPTION OF THE DRAWINGS

The present invention will be better understood, and its numerous objects and advantages will become apparent by reference to the following detailed description of the invention when taken in conjunction with the following drawings.

DETAILED DESCRIPTION

A screen-film system can be designed using the three classes of phosphors, making use of synergistic properties of the phosphors, which when combined in different proportions and geometry achieves different beneficial effects.

Non-linear Screen Response

Class 1 and class 2 phosphors can be combined and formed into a screen or screens that will respond with a non-linear light output for a linear x-ray exposure input. At low exposure levels the class 1 phosphor emits light which is useful in exposing the associated film emulsion. At higher exposure levels, the output of the quenching radiation by the class 2 phosphor in the screen will have a more pronounced effect at inhibiting the emission of light from the class 1 phosphor in the screen. At still higher levels of x-ray exposure, the output of the quenching radiation may completely inhibit the emission of light from the class 1 phosphor. The result of this scenario is a non-linear output of usable light.

The shape of the non-linear curve will vary depending on many factors, primarily the relative concentrations of the class 1 and class 2 phosphors in the screen. Class 3 phosphor can be added to the screen to add a linear output component to the overall characteristic response curve of the intensifying screen. Class 3 phosphors, which are simply conventional phosphors, can be used to reduce the non-linearities of the class 1/class 2 components, and the class 3 phosphor therefore may be valuable in achieving a desirable response curve for a particular screen application.

Figure 2A:
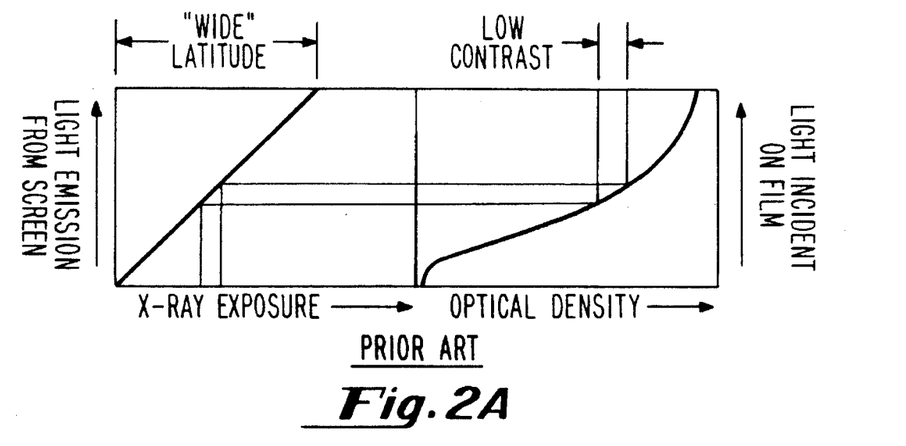
FIG. 2(A) is a graph showing both the light output of a prior art screen versus the x-ray input and the light input and contrast of a prior art film emulsion. The light output axis also serves as an indication of the light incident on the film axis, since the screens are tightly coupled to the film emulsion. For a typical wide latitude screen film system in radiology, the response of the screen is linear, however the characteristic curve of the film causes the optical density versus light exposure curve to be non-linear.
Figure 2B:
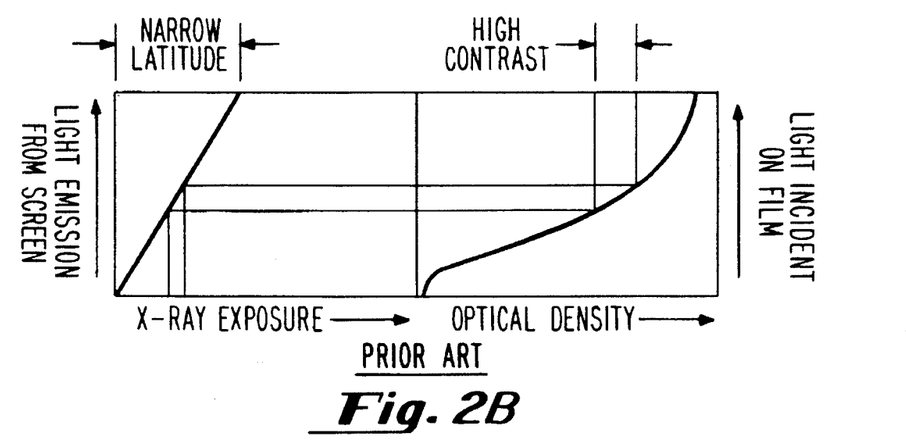
FIG. 2(B) is similar to FIG. 2(A), except that a narrow latitude, high contrast, prior art screen-film system is illustrated. The usable range of x-ray exposure is narrower than in FIG. 2(A), however the difference in optical densities (the radiographic contrast) is greater for the same difference in exposure at the screen (subject contrast). This is shown using the two lines starting at two different exposure values on the x-ray exposure axis, which are reflected about each curve to yield two different optical densities.
Figure 2C:
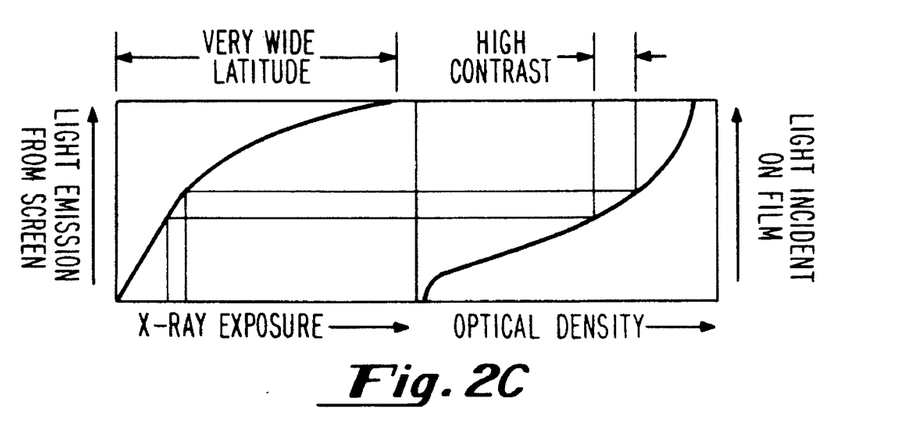
FIG. 2(C) is a graph of showing both the light output of the screen of the present invention versus the x-ray input and the light input and contrast of a film emulsion designed in accordance with the present invention. The graph depicts the capability of designing a non-linear screen output.

In order to illustrate the non-linear nature achievable by the present invention, consider the characteristic curves shown in FIG. 2(C). In one design embodiment, the curve at the low end would have high contrast, but towards the higher exposure ranges the slope of the curve would be reduced due to the quenching phenomenon. Although this will reduce the contrast at the higher exposures, it does extend the dynamic range of the screen-film system. Therefore, high contrast for most structures would be available, but films would be rarely overexposed due to the extended dynamic range at the high end of the screen-film response curve, i.e., characteristic curve. Other embodiments would include tailoring the characteristic curve of the film to be ideally matched to the emission characteristic of the screen. The curve shown in this figure is quasi-logarithmic in appearance.

Figure 3A:
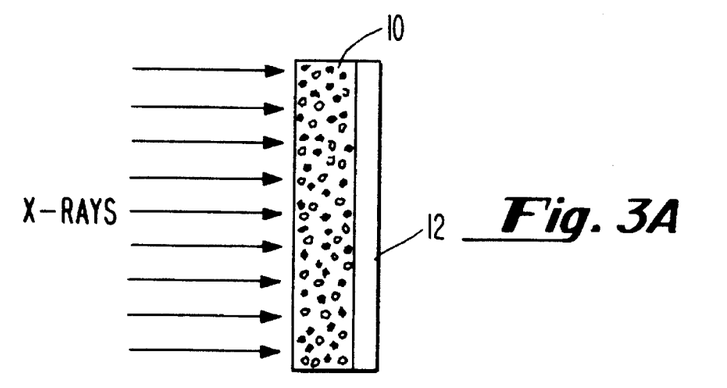
FIG. 3(A) is a diagrammatic view of a screen-film system constructed in accordance with the present invention utilizing class 1 and class 2 phosphors.

Referring now to FIG. 3(A), one embodiment of the present invention is depicted. An x-ray intensifying screen 10 is shown to include a class 1 phosphor (dark dots) and a class 2 phosphor (white dots). Emissions of electromagnetic radiation from the class 1 phosphor are quenchable by emissions of electromagnetic radiation from the class 2 phosphor when x-ray radiation is incident on screen 10. An emulsion 12 is positioned so that the emission of electromagnetic radiation from intensifying screen 10 is incident thereon. In this manner emulsion 12 is exposed to the emissions of intensifying screen 10. In one form of the invention, the class 1 and class 2 phosphors are combined so that screen 10 exhibits non-linear light emissions with respect to its x-ray exposure levels, at the same or at different x-ray energies.

Figure 3B:
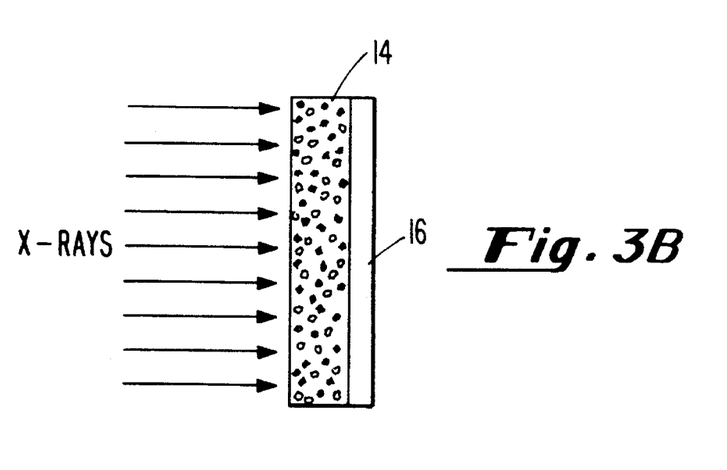
FIG. 3(B) is a diagrammatic view of a screen-film system constructed in accordance with the present invention utilizing class 1, class 2 and class 3 phosphors.

As shown in FIG. 3(B) intensifying screen 14 includes a class 1 phosphor (dark dots), a class 2 phosphor (white dots) and a class 3 phosphor (grey dots). In this embodiment, emissions of electromagnetic radiation from the class 3 phosphor are not quenched by emissions of electromagnetic radiation from the class 2 phosphor when x-ray radiation is incident on said screen. As indicated above, the class 3 phosphor introduces linearities into the characteristic curve for screen 14. An emulsion 16 is positioned so that the emission of electromagnetic radiation from intensifying screen 14 is incident thereon. In this manner emulsion 16 is exposed to the emissions of intensifying screen 14.

For purposes of either FIGS. 3(A) or 3(B), the class 1 phosphor can be selected from the group of phosphors comprising: ZnS:Cu,Co, ZnS:Cu,Fe, ZnS:Cu,Ni, ZnS:Ag, Co, ZnS:Ag,Fe, ZnS:Ag,Ni, ZnCdS:Cu,Co, ZnCdS:Cu,Fe, ZnCdS:Cu,Ni, ZnCdS:Ag,Co, ZnCdS:Ag,Fe and ZnCdS:Ag,Ni. Similarly, the class 2 phosphor can be selected from the group of phosphors comprising: $X_2O_2S:Nd$, where X can be Y, Gd, La or Lu, $YVO_4:Nd$ and $Y_3Al_{15}O_{12}:Nd$. For purposes of the embodiment shown in FIG. 3(B), the class 3 phosphor can be selected from the group of phosphors comprising: $Gd_2O_2S:Tb$, $YTaO_4:Nb$, LaOBr:Tm, LaOBr:Tb, $BaFCl:Eu$, $BaFBr:Eu$ and $CaWO_4$.

Radiographic Equalization

Radiographic equalization, i.e., optical density equalization, is generally achieved by altering the pattern of incident exposure to the patient, resulting in a more homogeneous distribution of exposure on the x-ray detector. There has also been introduced techniques for so-called "light equalization radiography," where the unaltered x-ray distribution incident on the screen-film system is detected, and inhomogeneities in the x-ray distribution are compensated for by exposing the under-exposed areas in the film to diffuse visible light in the dark room. This is called film dodging. The film is then developed, and the distribution of film density is more uniform.

Figure 4A:
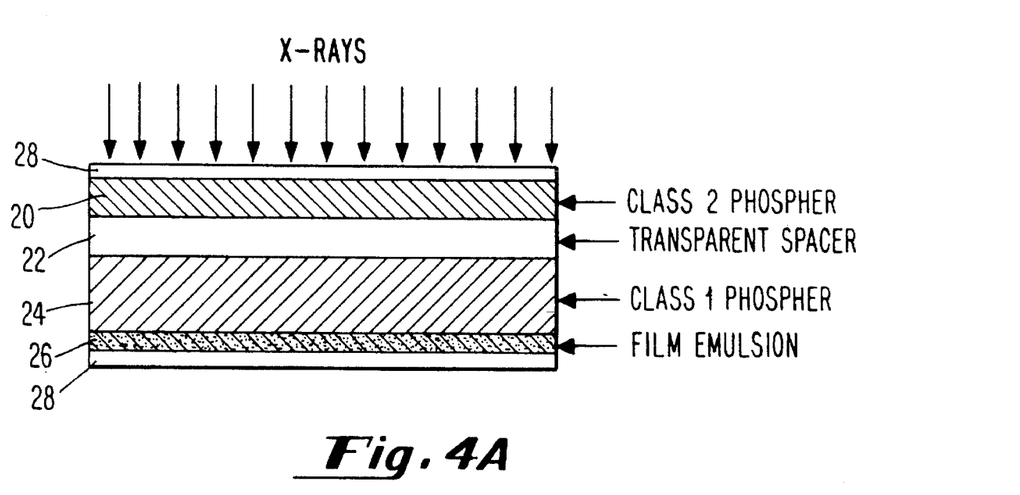
FIG. 4(A) is a section view of one embodiment of the invention, wherein radiographic equalization is desired.

The present invention can be used to equalize the distribution of optical densities on the radiographic image. Referring now to FIG. 4(A), a thin layer of class 2 phosphor 20 is coated onto a translucent plastic layer 22 of finite thickness. Underlying plastic layer 22 is a conventional thickness of a class 1 phosphor 24. The quenching radiation emitted by the class 2 phosphor is substantially blurred by the presence of plastic layer 22, due to the simple spread of light by optical diffusion across the gap created by the plastic. Therefore a diffuse (blurred) pattern of quenching radiation will be incident upon the underlying class 1 phosphor. In areas of global high exposure, the blurred quenching radiation will combine to reduce the overall emission of the class 1 phosphor in that region. In regions of global low exposure, the intensity of the blurred class 2 emission will be reduced, and less quenching would occur in those areas. This effect will result in a low-pass filter effect for the usable light exposure of film emulsion 26. A supporting cassette housing 28 is also depicted for holding diffusion member 22 to diffuse the radiative emissions of class 2 phosphor layer 20.

The thickness of plastic layer 22, combined with more subtle issues such as the mean path-length of the various optical emissions, will largely determine the degree of blurring and therefore the type of band-pass filtering that results. Large plastic thicknesses would result in substantial blurring, and the low frequency content of the image would consequently be de-emphasized. By proper design, the thickness layer provided by the film base could itself be turned into the blurring gap needed to achieve low-pass filtering.

For example, a class 2 phosphor could be placed on a front screen, and a class 1 phosphor on the back screen. The crossover (or print-through) of the quenching radiation from the front to the back screen will be blurred and will tend to reduce the overall emission of the usable light energy emitted by the class 1 phosphor. This design in effect takes what is a problem in most dual screen-film cassettes, and turns it into an advantage.

The invention in addition to its potential significant impact on screen-film radiographic systems, may also have application in electronic detector systems, such as image intensifiers. The screen characteristics described above could be used in concert with a photo cathode, which would emit electrons in proportion to the amount of radiation incident upon it from the primary phosphor. The electrons are then amplified electronically, as in a normal image intensifier. The quenching/quenchable phosphor pair may also be applicable at the rear end of the image intensifier system, where in this case both phosphors are struck by high energy electrons, and not electromagnetic radiation. The two phosphors would work in concert with each other as described above, thereby limiting the dynamic range of the light emitted by the image intensifier.

If a screen-film system is constructed in accordance with FIG. 4(A), the emission from the class 2 phosphor causes quenching of the class 1 phosphor emission. Because the class 2 phosphor emissions are blurred before they reach the class 1 screen, the fine detail is blurred. This will result in the quenching of only the lower frequency components in the class 1 phosphor emission. The film emulsion is sensitive only to the radiation emitted by the class 1 phosphor.

Figure 4B:
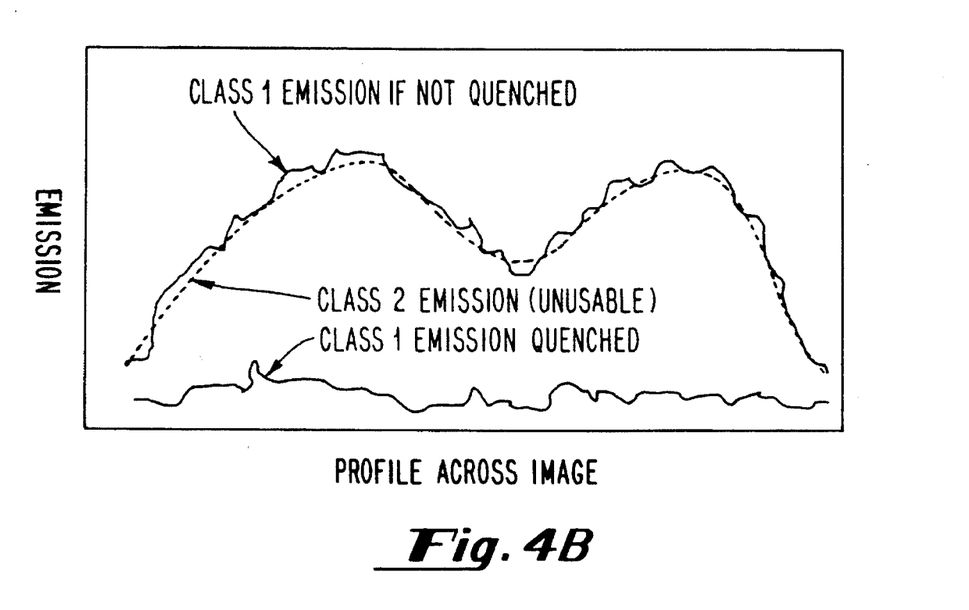
FIG. 4(B) is a graph of emission vs. profile for a class 1 phosphor emission which has not been quenched in accordance with the present invention and for a class 1 phosphor which has been quenched in accordance with the present invention.

As shown in FIG. 4(B) class 1 (unquenched) emissions exhibit high frequency structure (small bumps and valleys) as well has a lower frequency component (the broad hills and valleys). The class 2 emission is blurred, and so only the low frequency components are incident on the class 1 screen. Because the class 2 emission causes quenching of the class 1 screen output, the lower frequency components are quenched, and only the higher frequency components of the radiographic image remain. It is the higher frequency data that is important in most types of radiographic diagnosis. The particular bandwidth of the spatial filtering effect illustrated here can be regulated by the width of the transparent spacer, the relative thicknesses and x-ray cross sections of the phosphors, the path-length of the emitted radiations in the various screen binders and spacer layers, and other physical parameters as well.

Other embodiments of the system shown in FIG. 4(A), involves the use of such system for diagnostic medical imaging, wherein the x-ray radiation is polyenergetic x-rays. In addition, this system can be used for non-destructive testing applications wherein the x-ray radiation is radiation emitted from a source, such as an x-ray source or a gamma ray source. Still further, it is within the scope of the invention to use the system in auto radiography. In such an application, the radiation is radiation emitted from a source selected from the group comprising an x-ray ray source, a gamma ray source, a beta-particle source and an alpha particle source.

Photo-coupling of Screens to Electronic Imaging Cameras

A quenchable phosphor based system can be designed to overcome the quantum sink limitations that are experienced when lens/camera systems are coupled to the low light intensity emission of x-ray intensifying screens. In the conventional embodiment of such a system, an x-ray screen is struck by x-ray photons, emits light, and the emitted light is detected using an electronic imaging device such as a CCD camera. The lens coupling in the system is required to assure proper focusing of the light photons emitted by the screen. However, due to the inherent inefficiencies of even fast lenses and due to the loss of photons emitted from the screen due to solid angle effects, the efficiency of light collection by such a system is very low. On the order of 1 out of 1000 photons that are emitted by the screen are detected by the camera. Consequently, the number of light quanta used to form the image in the CCD camera are much more limited in number than the number of x-ray quanta absorbed in the intensifying screen, especially at high magnification factors. This means that the quantum noise in the imaging system arises predominantly in the optical stage of the system, and not in the x-ray detection phase. This is an intolerable situation because it leads to excessive and unnecessary x-ray doses to the patient.

Figure 5:
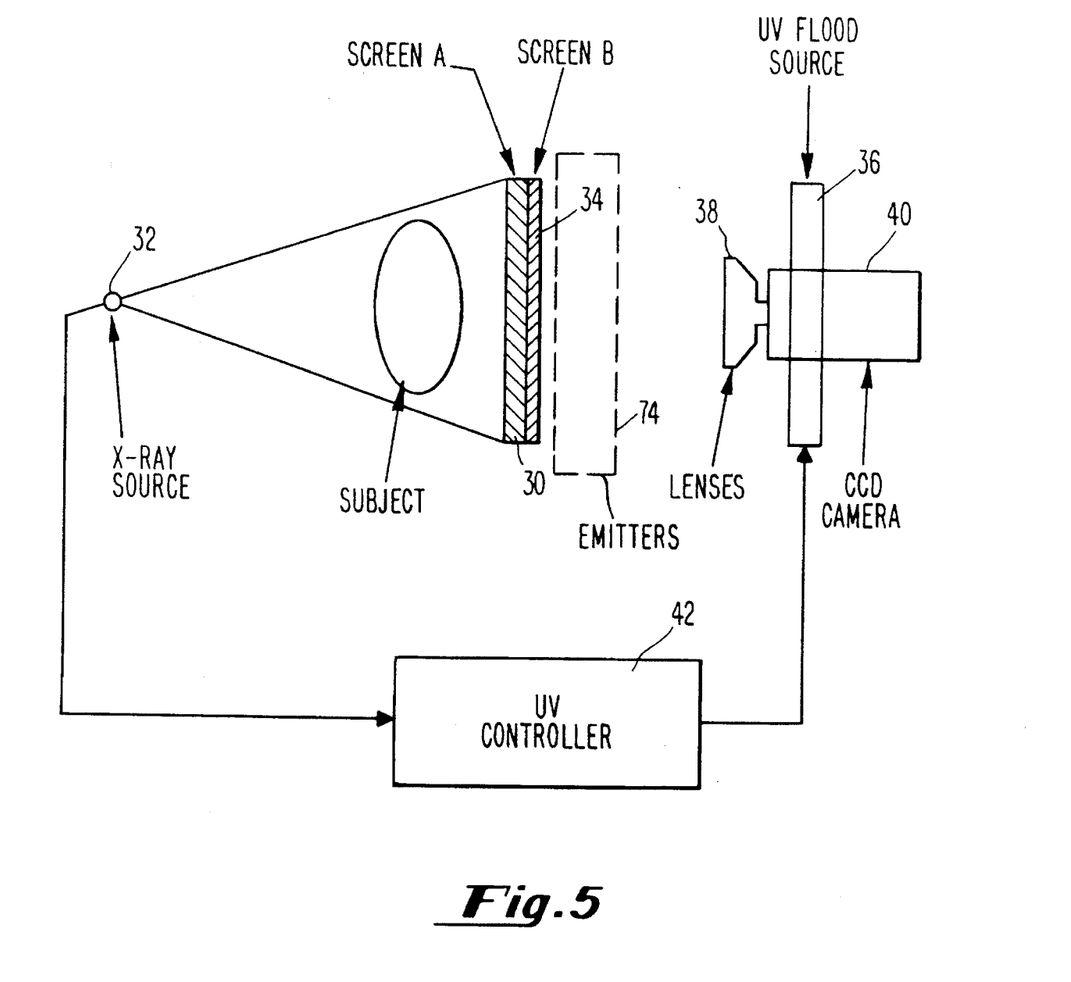
FIG. 5 is a diagrammatic view of an embodiment of the invention in which the quenchable phosphor is used to overcome quantum sink limitations in radiographic imaging applications where the radiographic image is to be viewed using a lens coupling system, for instance to a cooled CCD camera.

FIG. 5 illustrates the system which can circumvent the quantum noise problem in the optical coupling. In this system, screen A 30 is a conventional x-ray phosphor (class 2 phosphor) that emits a quenching radiation, such as infrared. The x-ray source 32 and subject are positioned with respect to screen 30 as with conventional radiography. On the back side of screen 30, is coated a thin layer of screen B 34, which is a quenchable phosphor (class 1). For the sake of description, let us assume that screen 34 emits green light when stimulated. A UV light source 36 can be used as the stimulation for screen 34, such that screen 34 is under constant and high intensify illumination by UV. This means that screen 34 will be constantly emitting green light, which is what the lens/camera system 38/40 is sensitive to in this example. Therefore, in the dark (i.e. no x-ray rays), there will be a very substantial fluence of green light photons being absorbed at electronic camera 40. Under x-ray exposure (or a continuous exposure rate), screen 30 will absorb x-rays and emit quenching radiation (e.g. infrared) that will reduce (quench) the emission of green light from screen 34 in a manner related (linearly or non-linearly) to the incident x-ray fluence (or fluence rate).

In this design, the number of photons used in the optical imaging chain is not merely the number of photons emitted by the x-ray screen, but rather is a function of the excitation efficiency of screen B and the intensity of UV light used to stimulate the green light emission from the screen. This design decouples the absolute number of light photons from the number of absorbed x-ray photons, and therefore alleviates the quantum sink in the optical stage that exists with conventional x-ray screens.

CCD camera technology has experienced rapid development in recent years, but has not been successfully or commercially applied to general clinical digital radiographic imaging because of the optical stage quantum sink issues. The present design overcomes this problem, allowing CCD technology to compete with the other modes of digital image acquisition, including pulsed radiographic and continuous exposure fluoroscopic imaging. This system may also be able to replace imaging intensifiers as well. The system of FIG. 5 is applicable to both radiography and fluoroscopy.

In a further use of the system FIG. 5, a UV controller 42 is depicted. It is desirable in certain circumstances to turn OFF UV source 36 just prior to turning ON x-ray source 32. Controller 42 serves this function. It receives a signal from source 32 that x-rays are about to be generated. Controller 42 in response to receiving this signal, turns OFF source 36. In such an embodiment, it is also desirable for the quenchable phosphor to be capable of significant persistence. In that situation, the excitation radiation is terminated just prior to the initiation of the x-ray radiation so that the effect of the quenching radiation is integrated over the x-ray radiation, without the reverse quenching reaction of the excitation radiation stimulation.

In a still further embodiment of the system shown in FIG. 5, an array of diffuse quenching radiation emitters 74 is placed behind the quenching and quenchable phosphors, which emitters can be activated to accomplish radiographic equalization of the image.

Figure 7:
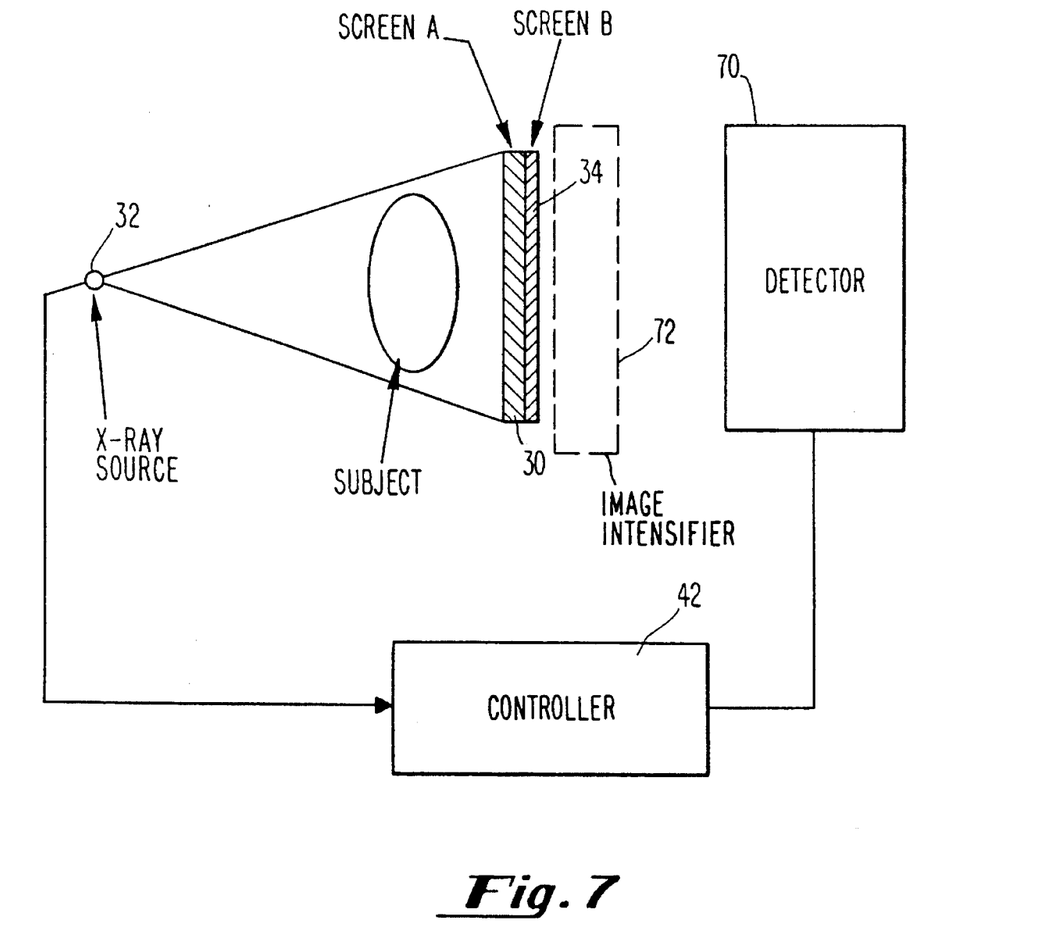
FIG. 7 is a diagrammatic view of another alternate embodiment of the invention.

A still further embodiment is shown in FIG. 7, wherein the lens/camera system 38/40 of FIG. 5 has been replaced with a detector system 70.

It is noted that the electronic detector system 70 can include the photo cathode system of an image intensifier 72 or a linear photo diode or an electronic detector device such as a two dimensional imaging photo diode or an electronic detector device such as a two dimensional charge coupled device. It is also within the scope of FIG. 5 that the intensifying screen 32 be coupled to the output phosphor of an image intensifier.

Dual Energy Subtraction Images

Figure 6A:
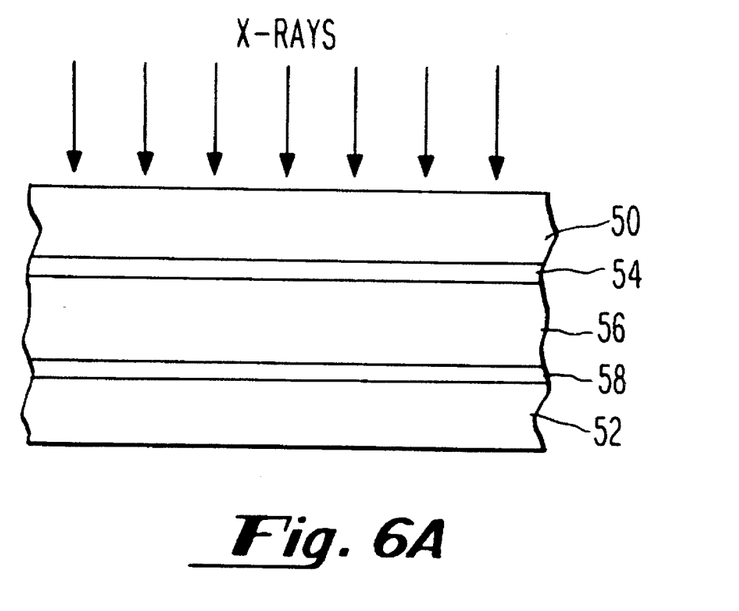
FIG. 6A is a section view of an embodiment of the invention wherein a dual energy subtraction image is desired.

A system for forming an image on a film in relation to x-ray radiation is shown in FIG. 6(A). The system is shown to include a first intensifying screen 50 which includes a first phosphor having a first k-edge for emissions of electromagnetic radiation when x-ray radiation is incident on screen 50. A second intensifying screen 52 is also shown which includes a second phosphor having a second k-edge for emissions of electromagnetic radiation when x-ray radiation is incident on screen 52. A first emulsion 54 is affixed to film 56 and positioned so that the emission of electromagnetic radiation from screen 50 is incident thereon. In other words, emulsion 54 is exposed to the emissions of screen 50. Emulsion 54 has a first characteristic curve 60, shown in FIG. 6(B). A second emulsion 58 is affixed to the bottom side of film 56 and positioned so that the emission of electromagnetic radiation from screen 52 is incident on emulsion 58. In other words, emulsion 58 is exposed to the emissions of screen 52. Emulsion 58 has a second characteristic curve 62 Shown in FIG. 6(B).

Figure 6B:
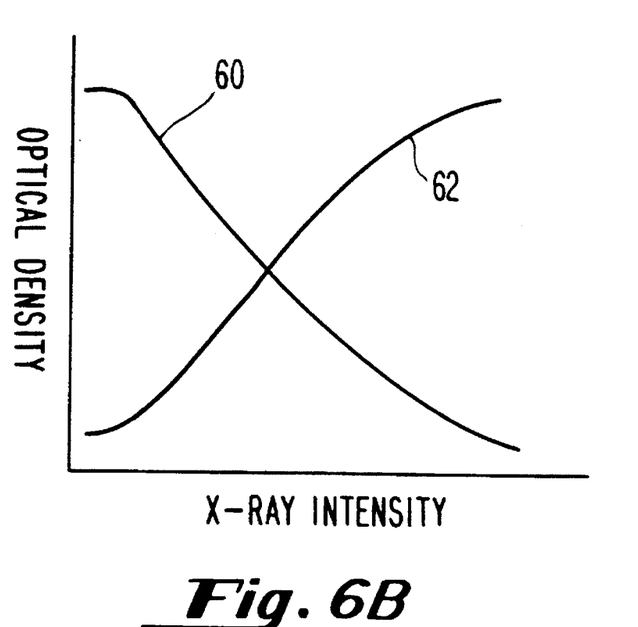
FIG. 6B is a graph of the characteristic curves for the emulsions shown in FIG. 6A.

As shown in FIG. 6(B), the first and second characteristic curves are of generally opposite polarity, so that the image formed on film 56 the first and second emulsions results from the addition of two images of generally opposite polarity. As will be appreciated, the slope of said first characteristic curve is opposite the slope of said second characteristic curve. It is preferred for emulsion 50 to be formulated to emit less electromagnetic radiation with increasing x-ray exposure and wherein for emulsion 52 to be formulated to emit more electromagnetic radiation with increasing x-ray exposure.

While the invention has been described and illustrated with reference to specific embodiments, those skilled in the art will recognize that modification and variations may be made without departing from the principles of the invention as described herein above and set forth in the following claims.

What is claimed is:

1. An x-ray intensifying screen comprising a class 1 phosphor and a class 2 phosphor, wherein emissions of electromagnetic radiation from said class 1 phosphor are quenchable by emissions of electromagnetic radiation from said class 2 phosphor when x-ray radiation is incident on said screen, wherein said class 1 and class 2 phosphors are intermixed and formed into a single layer.

2. The x-ray intensifying screen of claim 1, further comprising a class 3 phosphor, wherein emissions of electromagnetic radiation from said class 3 phosphor are not quenched by emissions of electromagnetic radiation from said class 2 phosphor when x-ray radiation is incident on said screen.

3. The intensifying screen of claim 2, wherein said class 3 phosphor is selected from the group consisting of : $Gd_2O_2S$:Tb, $YTaO_4$:Nb, LaOBr:Tm, LaOBr:Tb, $BaFCl$:Eu, BaFBr:Eu and $CaWO_4$.

4. The x-ray intensifying screen of claim 1, wherein said class 1 and class 2 phosphors are combined so that said screen exhibits non-linear light emissions with respect to its x-ray exposure levels, at the same or at different x-ray energies.

5. The intensifying screen of claim 1, wherein said class 1 phosphor is selected from the group consisting of : ZnS:Cu,Co, ZnS:Cu,Fe, ZnS:Cu,Ni, ZnS:Ag,Co, ZnS:Ag,Fe, ZnS:Ag,Ni, ZnCdS:Cu,Co, ZnCdS:Cu,Fe, ZnCdS:Cu,Ni, ZnCdS:Ag,Co, ZnCdS:Ag,e and ZnCdS:Ag,Ni.

6. The intensifying screen of claim 1, wherein said class 2 phosphor is selected from the group consisting of : $X_2O_2S$:Nd, where X can be Y, Gd, La or Lu, $YVO_4$:Nd and $Y_3Al_5O_{12}$: Nd.

7. An imaging system comprising:
   an intensifying screen comprising a class 1 phosphor and a class 2 phosphor, wherein emissions of electromagnetic radiation from said class 1 phosphor are quenchable by emissions of electromagnetic radiation from said class 2 phosphor when ionizing radiation is incident on said screen;
   a diffusion member positioned to diffuse the radiative emissions of said class 2 phosphor, prior to such emissions interacting with the emissions from said class 1 phosphor; and
   an emulsion, positioned so that the emission of electromagnetic radiation from said intensifying screen is incident on said emulsion, whereby said emulsion is exposed to the emissions of said intensifying screen; wherein said diffusion member has a width selected to achieve a predetermined spatial filtering effect.

8. The imaging system of claim 7, further comprising a supporting cassette housing, said housing containing said diffusion member, wherein the spatial frequency characteristics of the electromagnetic radiation emitted by said intensifying screen are altered and are useful in exposing said emulsion.

9. The imaging system of claim 7, wherein said system is used for diagnostic medical imaging and further comprising a source of x-ray radiation, wherein said x-ray radiation emitted from said source comprises polyenergetic x-rays.

10. The imaging system of claim 7, wherein said system is used for non-destructive testing applications and further comprising a source of x-ray radiation.

11. The imaging system of claim 7, wherein said system is used for non-destructive testing applications and further comprising a source of gamma radiation.

12. The screen-film imaging system of claim 7, wherein said system is used in relation to auto radiography wherein the radiation incident on said screen comprises radiation emitted from a source, said source selected from the group consisting of a gamma ray source, a beta-particle source and an alpha particle source.

13. A screen imaging system, comprising:
- an x-ray intensifying screen comprising a class 1 phosphor and a class 2 phosphor, wherein emissions of electromagnetic radiation from said class 1 phosphor are quenchable by emissions of electromagnetic radiation from said class 2 phosphor when x-ray radiation is incident on said screen, wherein said class 1 and class 2 phosphors are intermixed and formed into a single layer; and
- an electronic detector system, wherein said intensifying screen is coupled to said detector system.

14. The system of claim 13, wherein said electronic detector system comprises the photo cathode system of an image intensifier.

15. The system of claim 13, wherein said detector system comprises a linear photo diode.

16. The system of claim 13, wherein said detector system comprises a charge-coupled device array.

17. The system of claim 13, wherein said electronic detector system comprises a two dimensional charge coupled device.

18. The system of claim 13, wherein said intensifying screen is coupled to the output phosphor of an image intensifier.

19. An x-ray imaging system, wherein x-ray radiation is provided from a source, comprising:
- a first phosphor, positioned to absorb said x-rays, for emitting quenching radiation in response to the absorption of said x-rays, wherein said first phosphor is a class 2 phosphor;
- a source of excitation electromagnetic radiation; and
- a second phosphor, positioned to absorb said excitation electromagnetic radiation, for emitting quenchable radiation in response to the absorption of said excitation radiation, wherein said second phosphor is a class 1 phosphor and wherein said quenching radiation interacts with said quenchable radiation and wherein said quenchable radiation is used to form an image, wherein said class 1 and class 2 phosphors are intermixed and formed into a single layer.

20. The system of claim 19, wherein said excitation electromagnetic radiation comprises ultra violet light and said quenchable radiation comprises visible light.

21. The system of claim 19, further comprising a detector system comprising an electronic camera for converting said quenchable radiation into an electronic signal.

22. The system of claim 21 wherein said detector system comprises an electronic fluoroscopic imaging apparatus.

23. The system of claim 19, further comprising an array of diffuse quenching radiation emitters placed behind said first and second phosphors, which emitters, when activated accomplish radiographic equalization of the image.

24. The system of claim 19, wherein said second phosphor is capable of significant persistence, further comprising a controller connected to said source wherein said controller terminates said excitation radiation just prior to the initiation of the x-ray radiation so that the effect of the quenching radiation is integrated over the x-ray radiation, without the reverse quenching reaction of the excitation radiation stimulation.

25. An imaging system for use in relation to x-ray radiation, said system comprising:
- an intensifying screen comprising a class 1 phosphor and a class 2 phosphor, wherein emissions of electromagnetic radiation from said class 1 phosphor are quenchable by emissions of electromagnetic radiation from said class 2 phosphor when x-ray radiation is incident on said screen;
- an emulsion, positioned so that the emission of electromagnetic radiation from said intensifying screen is incident on said emulsion, whereby said emulsion is exposed to the emissions of said intensifying screen; and
- a diffusion member positioned to diffuse the radiative emissions of said class 2 phosphor, prior to such emissions interacting with the emissions from said class 1 phosphor, wherein the optical density of the resultant image is equalized;

wherein said diffusion member has a width selected to achieve a predetermined spatial filtering effect.

26. A film for use in a radiographic imaging system, said film comprising:
- a base layer;
- an emulsion layer, affixed to said base layer, on which said image is formed, wherein the composition of said emulsion is predetermined to be optimized in relation to the characteristic curve of an intensifying screen, said intensifying screen comprising a class 1 phosphor and a class 2 phosphor, wherein emissions of electromagnetic radiation from said class 1 phosphor are quenchable by emissions of electromagnetic radiation from said class 2 phosphor when x-ray radiation is incident on said screen.

27. The film of claim 26, wherein said composition of said film is predetermined so that said emulsion is sensitive to substantially the electromagnetic radiation emitted by said class 1 phosphor.

28. A system for forming an image on a film in relation to x-ray radiation, said system comprising:
- a first intensifying screen comprising a first phosphor having a first k-edge for emissions of electromagnetic radiation when x-ray radiation is incident on said first screen, said first screen having a first characteristic curve;
- a second intensifying screen comprising a second phosphor having a second k-edge for emissions of electromagnetic radiation when x-ray radiation is incident on said second screen, said second screen having a second characteristic curve;
- a first emulsion, affixed to said film and positioned so that the emission of electromagnetic radiation from said first intensifying screen is incident on said first emulsion, whereby said first emulsion is exposed to the emissions of said first intensifying screen, said first emulsion having been formulated in relation to said first characteristic curve; and a second emulsion, affixed to said film and positioned so that the emission of electromagnetic radiation from said second intensifying screen is incident on said second emulsion, whereby said second emulsion is exposed to the emissions of said second intensifying screen, said second emulsion having been formulated in relation to said second characteristic curve, wherein said first and second characteristic curves are of generally opposite polarity, so that the image formed on said film by said first and second emulsions results from the addition of two images of generally opposite polarity.

29. The system of claim 28, wherein the slope of said first characteristic curve is opposite the slope of said second characteristic curve.

30. The system of claim 28, wherein said first emulsion is formulated to emit less electromagnetic radiation with increasing x-ray exposure and wherein said second emulsion is formulated to emit more electromagnetic radiation with increasing x-ray exposure.

* * * * *